United States Patent [19]

Te'eni

[11] Patent Number: 5,543,188
[45] Date of Patent: Aug. 6, 1996

[54] FLEXIBLE PROTECTIVE MEMBRANE PARTICULARLY USEFUL FOR WATERPROOFING AND PROTECTING REINFORCED CONCRETE BODIES AND METAL PIPES

[76] Inventor: Moshe Te'eni, 53A Ir Shemesh Street, 69 086 Tel Aviv, Israel

[21] Appl. No.: 397,125

[22] PCT Filed: Aug. 24, 1993

[86] PCT No.: PCT/US93/07930

§ 371 Date: Mar. 9, 1995

§ 102(e) Date: Mar. 9, 1995

[87] PCT Pub. No.: WO94/04349

PCT Pub. Date: Mar. 3, 1994

[30] Foreign Application Priority Data

Aug. 25, 1992 [IL] Israel ......................................... 102932

[51] Int. Cl.$^6$ ..................................................... B32B 13/00
[52] U.S. Cl. ............................ 428/36.2; 156/89; 427/209; 427/403; 428/70; 428/246; 428/247; 428/253; 428/256; 428/284; 428/285; 428/703
[58] Field of Search ............................... 428/70, 247, 252, 428/253, 254, 269, 287, 307.7, 312.4, 703, 246, 256, 284, 285, 286, 283, 35.7, 35.9, 36.1, 36.2; 427/209, 403; 156/89

[56] References Cited

U.S. PATENT DOCUMENTS

| | | |
|---|---|---|
| 1,953,920 | 4/1934 | Blackman . |
| 2,008,472 | 7/1935 | Seailles . |
| 2,718,829 | 9/1955 | Seymour et al. . |
| 2,850,890 | 9/1958 | Rubenstein . |
| 2,894,857 | 7/1959 | Uraneck et al. . |
| 2,921,463 | 1/1960 | Goldfein . |
| 3,021,291 | 2/1962 | Thiessen . |
| 3,177,902 | 4/1965 | Rubenstein . |
| 3,278,365 | 10/1966 | Adams et al. . |
| 3,637,457 | 1/1972 | Gothard et al. ........................ 264/228 |
| 4,084,030 | 4/1978 | Goodale et al. ........................ 428/171 |
| 4,315,392 | 2/1982 | Sylvest ..................................... 52/309.1 |
| 4,339,289 | 7/1982 | Lankard ..................................... 156/91 |
| 4,366,209 | 12/1982 | Babcock ..................................... 428/446 |
| 4,392,335 | 7/1983 | Heiman ..................................... 428/413 |
| 4,435,472 | 3/1984 | Leah ..................................... 428/333 |
| 4,506,485 | 3/1985 | Apostolos ..................................... 52/515 |
| 4,600,657 | 7/1986 | Wegehaupt et al. ..................... 428/447 |
| 4,634,626 | 1/1987 | Yamaguchi et al. .................. 428/312.4 |
| 4,647,496 | 3/1987 | Lehnert et al. ........................ 428/251 |
| 4,647,505 | 3/1987 | Blackie et al. ........................ 428/396 |
| 4,653,243 | 3/1987 | Burkett ..................................... 52/741 |
| 4,661,387 | 4/1987 | Watanabe et al. ........................ 428/36 |
| 4,707,961 | 11/1987 | Nunley et al. ........................ 52/408 |
| 4,778,718 | 10/1988 | Nicholls ..................................... 428/287 |
| 4,783,942 | 11/1988 | Nunley et al. ........................ 52/410 |
| 4,789,578 | 12/1988 | Twyford et al. ........................ 428/40 |
| 4,874,675 | 10/1989 | Ceska ..................................... 428/521 |
| 4,906,504 | 3/1990 | Skjold Petersen ........................ 428/85 |
| 4,937,021 | 6/1990 | Danforth et al. ........................ 264/26 |
| 5,030,502 | 7/1991 | Teare ..................................... 428/143 |
| 5,098,780 | 3/1992 | Nemunaitis et al. ................. 428/312.4 |
| 5,102,726 | 4/1992 | Gabbay ..................................... 428/251 |
| 5,135,806 | 8/1992 | Eiben et al. ........................ 428/364.4 |
| 5,231,811 | 8/1993 | Andrepont et al. . |

FOREIGN PATENT DOCUMENTS

| | | |
|---|---|---|
| 0013928A1 | 8/1980 | European Pat. Off. . |
| 2609423 | 7/1988 | France . |
| 676978A5 | 3/1991 | Switzerland . |
| 1518263 | 7/1978 | United Kingdom . |
| 1602602 | 11/1981 | United Kingdom . |

*Primary Examiner*—James J. Bell
*Attorney, Agent, or Firm*—Panitch Schwarze Jacobs & Nadel, P.C.

[57] ABSTRACT

A flexible, protective and waterproofing membrane for application onto a body to conform to a surface of the body and to be bonded thereto is provided. The membrane includes a flexible polymeric sheet which has an open-textured surface on each of its opposite faces. The textured surfaces are impregnated with a dry, cementitious material and define interconnected internal voids open to the atmosphere. The dry cementitious material includes a water-hardenable cement which is substantially non-hydrated.

26 Claims, 3 Drawing Sheets

FLEXIBLE PROTECTIVE MEMBRANE PARTICULARLY USEFUL FOR WATERPROOFING AND PROTECTING REINFORCED CONCRETE BODIES AND METAL PIPES

FIELD AND BACKGROUND OF THE INVENTION

The present invention relates to protective membranes for providing protection against corrosion and/or water penetration. The protective membrane of the present invention is capable of adhering to cement mortar or concrete that sets and hardens whilst in contact with it. It is therefore particularly useful for providing such protection to buildings and concrete structures and also to metal pipes and is therefore described below with respect to such applications, but it will be appreciated that the invention could advantageously be used in other applications, e.g., for protecting sheet metal constructions.

The main cause of degradation of reinforced concrete structures is corrosion of the steel reinforcement. Initially, the steel is protected from corrosion by the "passivation effect" of the high alkalinity of the concrete. However, in the course of time, the penetration of carbon dioxide from the air into the concrete converts the highly alkaline calcium hydroxide, present in the concrete, into non-alkaline calcium carbonate, thus diminishing the alkalinity of the concrete and the above passivation effect. In addition, the penetration into the concrete of chlorides dissolved in water also diminishes the passivation effect. With the diminishing or elimination of the passivation effect, oxygen in the presence of moisture in the air initiates corrosion of the steel reinforcement at a rate dependent on the rate of supply of the oxygen.

Steel pipes are commonly protected against corrosion by bonding to the pipe polyethylene or other polymeric tape wrapped around it or by forming a layer of cementitious mortar around the pipe. However, polymeric tape protection for steel pipes does not provide the above-described passivation effect to the pipe to inhibit corrosion; moreover, any imperfections in the polymeric tape which may be initially present, or which may appear during use, expose the pipe to corrosion in the vicinity of the imperfection. Whilst a cementitious mortar layer applied around the pipe provides the above-described passivation effect to the pipe surface, this effect is diminished during the course of time as the cementitious layer is unprotected and therefore undergoes carbonation; moreover, the penetration of salts in a soluble form through the unprotected concrete also diminishes this passivation effect.

Another method of protecting a steel pipe is to apply a concrete layer around the pipe, and to simultaneously wrap a polymeric tape over the concrete layer. However, concrete does not adhere well or at all to polymeric surfaces, and therefore the effectiveness of the polymeric tape in preventing carbonation and the penetration of moisture and salts is limited.

Coatings of bituminous materials or polymeric resins are also frequently used to waterproof concrete structures and steel pipes and to protect them against corrosion. However, the application of such materials over a cementitious surface prevents the possibility of bonding an additional layer of concrete or concrete paste mortar over that coating after it has hardened since the hydration products of cement mortar will generally not bond well to such coatings.

A textile fabric bandage, pre-impregnated with a cementitious mix is currently used in building practice. The impregnated bandage is a carrier of dry "dormant" cementitious glue. On wetting, the dry cementitious mass attains a pasty consistency and the bandage is capable of adhering to the hydration products of cementitious materials. If cement mortar is cast over the pre-impregnated bandage, on hardening it will adhere to the bandage and the bandage will form a skin over the cementitious layer. If cement mortar is cast over both sides of the pre-impregnated bandage, on hardening a multilayered solid mass is attained with interlayer continuity. The bandage is used for waterproofing and repair.

SUMMARY OF THE INVENTION

An object of the present invention is to provide a flexible protective membrane particularly useful for waterproofing buildings, reinforced concrete structures, metal pipes, sheet metal constructions and the like, and also for protecting them against corrosion.

According to the present invention, there is provided a flexible protective membrane comprising a flexible polymeric sheet providing protection against the penetration of water and having an open-textured surface on at least one of its opposite faces defining interconnected internal voids open to the atmosphere and capable of being impregnated by a cementitious bonding material.

The flexible protective membrane thus provides a means for bonding polymeric sheeting to other surfaces through the use of cementitious material which serves as the bonding agent. The membrane thus provides a way in which polymeric sheeting can be bonded to a building surface with a layer of cement mortar or to a mass of concrete or cement mortar cast against it. The novel protective membrane thus exploits the excellent properties of polymeric sheeting to serve as a protective and waterproofing layer and the use of cementitious material as the universal binder and bonding material in building practice.

Building a multi-layered system is a common feature of building technology. The hydration products of Portland cement are commonly used as the cementing agent both in the manufacture of building products and in the "in situ" preparation of building materials. A polymeric membrane which adheres to the hydration products of cement mortar cast over it may therefore be introduced into the conventional structure in building elements. Inter-layer continuity will be maintained, and the passage of moisture, vapor and gases from the atmosphere into the concrete mass will be largely prevented. A membrane which bonds to cement mortar will allow two overlapping pieces of membrane to be bonded together by placing cement mortar in the overlap.

According to further features in the preferred embodiments of the invention described below, the open-textured surfaces are preferably defined by fibrous surface layers bonded to the opposite faces of the polymeric sheet. The fibrous layers may be of natural or synthetic fibers, such as polyester textile fibers, polypropylene fibers, and the like. Each fibrous layer may be made of woven, non-woven, knitted, knotted or net-like material, etc. and is such that it defines interconnecting internal voids capable of being impregnated by a bonding agent in the form of a cementitious slurry which will result in the formation of a continuous phase completely embedding the fibrous material and bonding to it. It is contemplated, however, that the polymeric sheet itself could be formed with an open-textured surface which defines the interconnected internal voids open to the atmosphere and capable of being impregnated by the cementitious bonding material.

When the open-textured surfaces are defined by fibrous layers, such fibrous layers may be bonded to the polymeric sheet using commercially available polymeric bonding agents, as known in the polymeric sheet manufacturing field. Another method which may be used is to impregnate a fibrous sheet with liquid polymer, and whilst the polymer is still liquid bond unimpregnated fibrous layers on opposite sides thereof. A further method would be to coat and partially impregnate a fibrous layer on one side with liquid polymeric material and then to bond another fibrous layer to the liquid polymeric material. A still further method that could be used would to be to coat and partially impregnate each of two fibrous layers with liquid polymeric material on one side, and then bond the two fibrous layers together at their polymeric material faces.

The polymeric layer formed after solidification of the liquid polymeric material provides the membrane with its waterproofing properties. Materials suitable for the polymeric layer are any polymeric materials that form a flexible and durable polymeric layer having waterproofing properties to which the fibrous layers can be bonded. Examples of materials suitable for the polymeric layer include polyvinyl chloride (PVC), polyethylene, and elastomeric-materials such as polyurethane, etc.

According to further features in the described preferred embodiments, at least one, but preferably both, of the fibrous surface layers may be pre-impregnated with a cementitious bonding agent which remains in a substantially non-hydrated condition until application of the membrane. This may be effected by applying a slurry containing unhydrated cement particles in a liquid carrier to the fibrous open textured surfaces of the polymeric sheet. Following pre-impregnation, the impregnating material should set to a quasi-solid state while the cement powder within it should remain in a substantially non-hydrated state. If hydrated at all, the degree of hydration of the cement powder should not significantly interfere with the further hydration and consequent hardening of the bonding material following rewetting by contact with the concrete or cementitious bonding material applied at the site. The degree of hydration following pre-impregnation should not interfere with the handling properties of the membrane.

For example, if the liquid carrier in the slurry with the cement particles is an aqueous carrier, the water in the slurry should be quickly dried before significant hydration of the cement particles in the pre-impregnant can take place and set retarding chemicals such as gluconates may be used to reduce hydration. The liquid carrier in such a slurry, however, may be a non-aqueous carrier, such as an alcohol.

The fibrous surface layers serve to link together the bonding material pre-impregnated therein with the polymeric sheeting, and to regulate the distribution of the bonding material over the surface of the polymeric layer. They also serve as a storage facility for the bonding material under sheltered conditions until use and define interconnected internal voids open to the atmosphere such that the impregnation of these surface fibrous layers with the cementitious bonding material will result in the formation of a continuous phase completely enveloping and containing within it the fibers.

One way of joining the fibrous surface layers the polymeric sheeting in the manufacturing process is, as is commonly done, by wetting the face of the polymeric sheeting with a thin layer of suitable polymeric glue which adheres well to the sheeting, and then pressing the fibrous layer against the glue so that the fibrous layer becomes partially embedded in the thin layer of glue and thereby forms the fibrous surface layer. It is necessary to ensure, in this process, that a sufficient part of the fibrous surface layer remains free of glue so that sufficient space is provided for the impregnating material. Glueing the fabric to the polymeric sheeting in this manner results in the formation of a thin layer of glue which separates the polymeric sheeting from the fibrous surface layer and the impregnating material.

The role of the impregnating/bonding material in the membrane is to provide the membrane with a surface to which the hydration products of cement mortar/concrete cast against the membrane can adhere. This material thus secures the bond and interlayer continuity between the polymeric layer and the outer layers of cement mortar/concrete that harden while in contact with the membrane.

An effective way to achieve good bond between two cementitious layers is to cast the two layers against each other while they are both still in their "wet" condition so that they harden after having attained intimate contact in the "wet" condition. A good bond may be similarly achieved when "wet" concrete, which hardens by hydration, is cast against a suitable polymeric resin, in its liquid which hardens by polymerization. A good bond will therefore be achieved between a "wet" cementitious material cast over the membrane impregnated with the bonding material still in its "wet" state both in the case wherein the impregnating material is cementitious and hardens by hydration, and in the case wherein the impregnating material is resinous and hardens by polymerization.

The membrane may be pre-impregnated with the impregnating material during or following the manufacture of the membrane. One suitable bonding material for a pre-impregnated membrane entails the formation of an intermediate state of the impregnated bonding material following impregnation and prior to use. In this intermediate state, the bonding material has not significantly hardened, but has attained a quasi-solid condition in which it remains until the time of actual use. The impregnating material in the intermediate state should be sufficiently strong and chemically stable to ensure that, together with the fibrous structure of the fibrous surface layers, it remains mechanically stable until the membrane is applied at the site; however, the membrane must not be too rigid, so that its handling properties are not unduly restricted. In this way the surface layer is such that on wetting it becomes self-adhesive and is capable of bonding to external surfaces.

As alternative to forming a bonding material having an intermediate state as described above, an impregnating material for pre-impregnation can be used which will fully harden after impregnation, with no intermediate state, as long as, following hardening, it provides the membrane with a surface to which hydration products of a cement layer cast against the membrane can adhere, and further providing that in its hardened state the bonding layer does not jeopardize the membrane's flexibility and handling properties.

Impregnation can also be done on site either during or immediately prior to the appliction of the membrane. Suitable impregnating materials include materials similar to those used for pre-impregnation as well as others such as water dispersible polymeric resins such as water soluble epoxy, and water soluble polyurethane. Impregnating materials suitable for in situ impregnation should harden at a rate suited to the time and sequence of the operations involved in the specific application.

The impregnating materials, both for pre-impregnation and in situ impregnation should be, in their initial state, sufficiently fluid, and of fine grain size if containing Solid particles, to penetrate the open spaces of the fibrous surface layers and fully wet and surround the fibers. Both types of impregnating materials should be such that, following application of the membrane, the material will harden to a strong, solid state, constituting a bonding layer which is capable of adhering to the hydration products of cementitious materials formed while in contact with it. In both categories of impregnating materials, the hardening will be the result of a chemical or physical/chemical process which is not dependent on water loss of the system to the environment, and which therefore could also occur in an enclosed environment.

The open-textured surface of the fibrous surface layers nay first be pre-impregnated with a water-dispersible polymeric resin to serve as a priming layer for the slurry of cement particles. Examples of such priming layer include a two-component water-dispersible expoxy resin and a water-dispersible polyurethane resin. The pre-impregnation of the fibrous surface layers with non-hydrated cement particles can also be effected by a dry process, wherein the cement particles, preferably mixed with a powdered organic binder and possibly other additives, are applied as a powder over the fibrous surface layer of the polymeric sheet and forced into that layer by the application of pressure and vibration at a moderately elevated temperature so that the powdery mass consolidates and becomes stablilized in the fibrous surface The pre-impregnant material, whether applied as a slurry or as dry powder, may also include one or more of the following additional additives: mineral fillers, such as fine silica powder, microsilica, clay minerals, etc., to improve the dimensional stability of the mix and its "wettability"; additives, such as sulphonated melamine-formaldehyde, to improve workability of the slurry; additives, such as calcium formate or sodium gluconate, to retard or accelerate the rate of hydration; organic glues or polymeric additives, such as water soluble cellulose ethers, water redispersible polymeric powders, polymeric emulsions or resins to create in strength in the quasi-solid state, or to regulate flow properties, improve flexibility and enhance strength and bond properties of the bonding layer after hydration.

The pre-impregnant material may also be a material which consists of or includes a non-cementitious material bondable to a cementitious material. Examples of such non-cementitious materials are fine silica powder, microsilica and clay minerals. Such materials may be applied in the same manner as the per-impregnating cementitious materials.

Following are several examples of protective membranes constructed in accordance with the present invention:

A sheet of PVC (polyvinylchloride) of 1 mm is coated on both faces with a thin layer of a polymeric thermoplastic glue commonly used for adhering fabrics to PVC sheets, and a fibrous layer of polyester textile fibres of 15 denier is applied to the two faces of the coated PVC sheet so that the fibres become partially embedded in the adhesive. The adhesive is then heated and polymerized form a strong solid.

The so-formed fibrous layers on the two sides of the polymeric sheet are then impregnated with a slurry of the following proportions by weight:

| | |
|---|---|
| ordinary Portland cement | 1,000 |
| fine silica sand | 200 |
| microsilica | 60 |
| polymeric emulsion* | 25 |
| hydroxyethyl cellulose | 2 |
| sulphonated melamine formaldehyde | 20 |
| water | 400–500 |

*for example an acrylic emulsion, such as a wholly acrylic emulsion, acrylic-styrene emulsion or a styrene-butadiene emulsion.

The slurry so applied is dried by hot air at a temperature of up to about 140° C. for a period sufficient to evaporate the water. Following drying the impregnated surface of the fibrous layer should preferably be mechanically brushed to remove excess impregnating material and improve the wettability and bonding properties of the surface.

A protective membrane may be impregnated with a slurry as described above, except that the liquid carrier in the slurry is ethyl alcohol, rather than water.

A protective membrane may be impregnated with a water based slurry as described above, except that before the cement slurry is applied to the fibrous layers, the fibrous layers are pre-impregnated with a primer based on a water-dispersible polyurethane resin.

DESCRIPTION OF PREFERRED EMBODIMENTS

Figure 1:
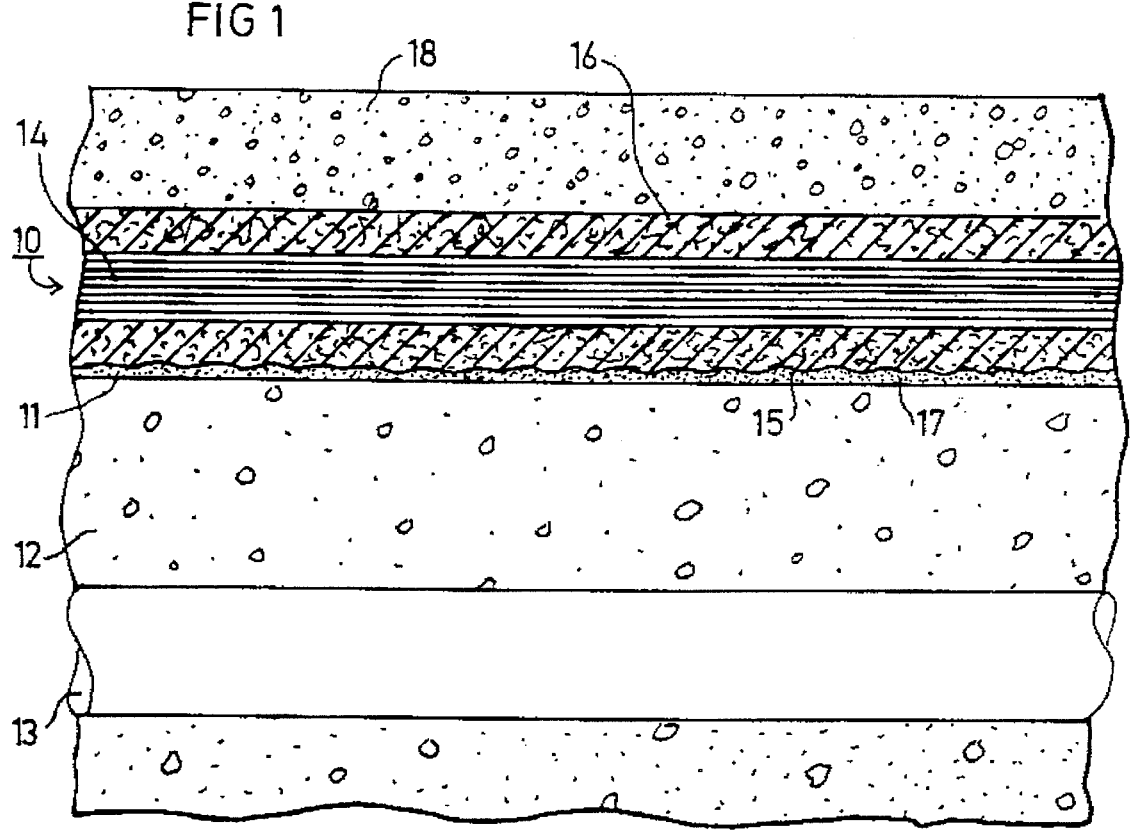
FIGS. 1–10 of the drawings illustrate various applications of such protective membranes.

FIG. 1 illustrates the protective membrane 10 bonded to one face 11 of a reinforced concrete structure 12, which is reinforced with steel rods 13. The protective membrane 10 includes a polymeric sheet 14 having fibrous surface layers 15, 16 on its opposite faces, each defining an open-textured surface layer having interconnected internal voids open to the atmosphere and capable of being impregnated with bonding material. As described earlier, the two fibrous surface layers 15, 16 are pre-impregnated with a cementitious bonding material which is substantially in a non-hydrated condition, or with a non-cementitious material bondable to a cementitious material. Fibrous surface layer 15 is bonded to the surface of the reinforced concrete structure 12 by a layer of cement mortar 17 possibly modified by polymeric additives to improve adhesion and bond properties. Water from the fresh mortar mix 17 "wets" the pre-impregnated cement bonding layer thereby hydrating the cement within it and producing a strong bond with the concrete body of the reinforced concrete structure.

In another embodiment of FIG. 1, the fibrous surface layer 15 has not been pre-impregnated and is impregnated on site prior to application with a water soluble polymeric resin such as water soluble epoxy and is then bonded by the cementitious bonding layer 17 to concrete body 12.

In yet another embodiment of FIG. 1, fibrous surface layer 15 is impregnated on site prior to application of the membrane in two stages. In the first stage, the fibrous surface layer is partially impregnated with a water dispersible polymeric resin such as water dispersible epoxy and then in a second stage, the impregnation is completed with a cementitious slurry and then the membrane is bonded to the concrete body 12 by a cement mortar layer 17.

In yet another embodiment of FIG. 1, the membrane having fibrous surface layer 15 impregnated by any one of the methods described above is used whilst in a "wet" state and the fibrous surface layer 15 of the membrane is directly applied in the "wet" state to the surface of the concrete body 11. In this case, the mortar layer 17 is absent.

In yet another embodiment of FIG. 1, the central polymeric layer 14 is made of polyurethane resin and fibrous surface layers 15, 16 are made from polypropylene fibres.

Figure 2:
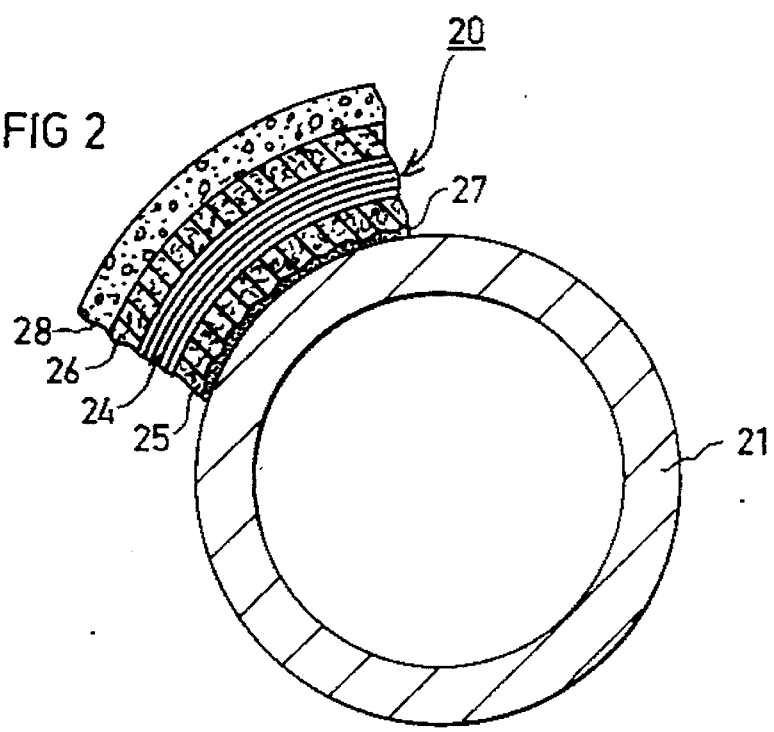

FIG. 2 illustrates the membrane, therein designated 20, applied to a steel pipe 21. In this case, the membrane 20 is in the form of a tape spirally wrapped around the pipe 21 to form a plurality of layers, with each layer partially overlapping the underlying layer. The tape 20 includes a polymeric layer 24 and fibrous surface layers 25 and 26 on its opposite sides. The membrane is bonded to the pipe by the cementitious mortar layer 27. If pre-impregnated with a cementitious impregnant, water from the mortar layer will "wet" the pre-impregnated cement particles thereby hydrating the cement within it and producing a strong bond with the pipe surface.

In another embodiment relating to FIG. 2, the membrane is used with fibrous surface layers which have not been pre-impregnated. In such a case, fibrous surface layer 25 can be impregnated on site with a cement slurry and then bonded to the pipe surface by a layer of cement mortar 27.

In another embodiment relating to FIG. 2, fibrous surface layer 25 can be impregnated in two stages. In the first stage, the fibrous surface layer is partially impregnated with a polymeric as a primer. In the second stage, the impregnation of the fibrous surface layer is completed with a cement slurry and then bonded to the pipe surface with a layer of cement mortar 27.

In another embodiment relating to FIG. 2, the fibrous surface layer 25 is impregnated with water dispersible polymeric resin such as water dispersible epoxy and then the impregnated membrane is bonded to the pipe surface by cement mortar layer 27.

In any of the above described embodiments, the bonding layer 27 can be formed from the impregnating material.

Figure 3:
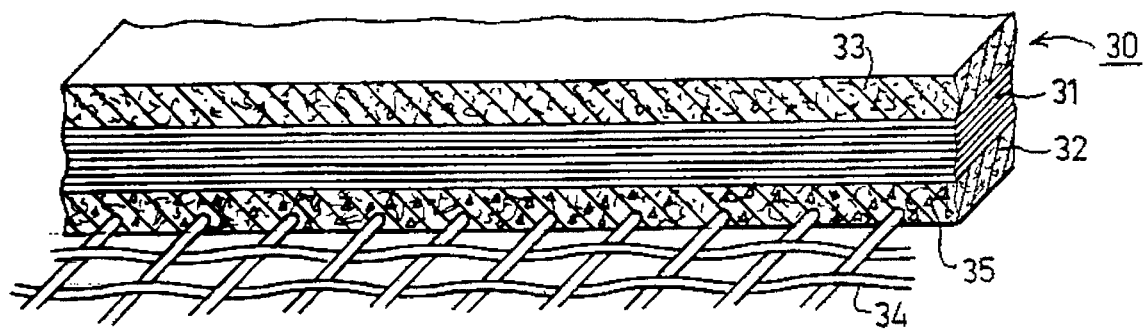

FIG. 3 illustrates a membrane 30, also including a polymeric sheet 31 and fibrous surface layers 32, 33 pre-impregnated with cementitious bonding material on its opposite faces, as described above with respect to FIGS. 1 and 2. The membrane 30 illustrated in FIG. 3, however, also includes a pliable metal screen layer 34 applied over the fibrous surface layer 32, or within the fibrous surface layer 32, when the membrane is used to prevent corrosion of a structure by cathodic protection. In another configuration relating to FIG. 3, fibrous surface layer 32 contains conductive filler such as carbon black. In yet another configuration relating to FIG. 3, the fibrous surface layer contains conductive filler and the metal screen is absent.

Figure 4:
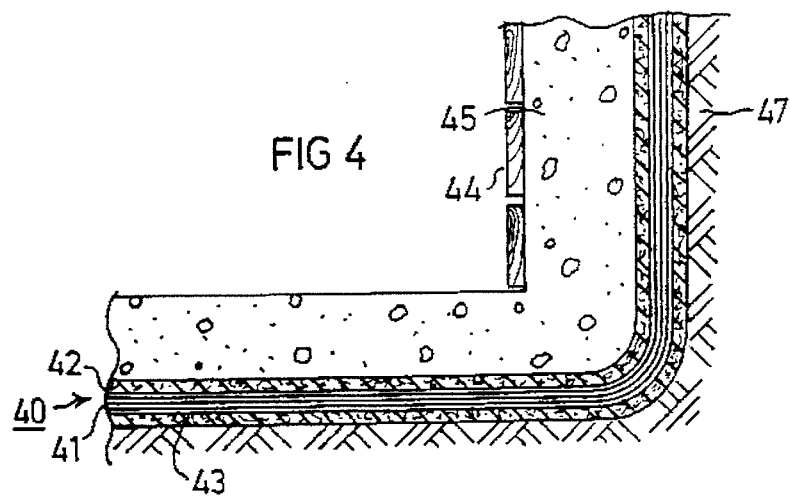

FIG. 4 illustrates the protective membrane 40 used for the waterproofing, on its outer face, of a concrete element 45 cast against the ground 47 and consisting of a slab and a wall. The membrane 41 has fibrous surface layers 42, 43, pre-impregnated with cementitious bonding material and is placed on the ground, behind the shutters 44, in the desired position and the concrete is cast directly over it.

In this application, the surface layers 42, 43 of the membrane 40 are preferably pre-impregnated with a cement based impregnating material. As the wet concrete is cast on the membrane, the water from the concrete mix "wets" the pre-impregnated bonding material in the surface layer 42 and causes hydration of the cement particles in the surface layer 42. The concrete mass then hydrates and hardens simultaneously and in contact with the cement particles in surface layer 42 to form strong bond and interlayer continuity.

Figure 5:
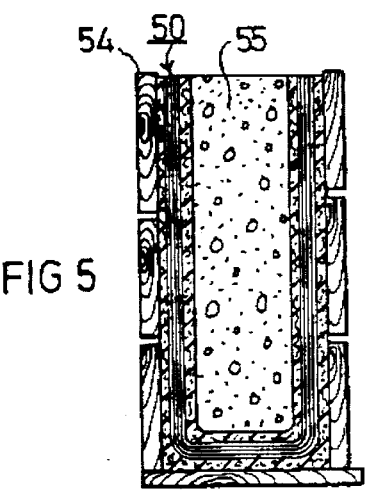

FIG. 5 illustrates another application wherein the membrane 50 is applied to line the inner surfaces of the shuttering 54 so that the membrane becomes integrally bonded on all the surfaces of the cast concrete block 55 formed by the shuttering.

Figure 6:
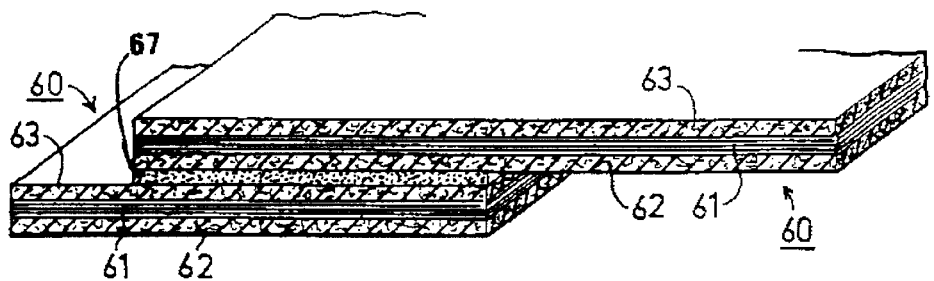

FIG. 6 illustrates overlapping pieces of membrane 60. Two overlapping pieces of membrane can be bonded to make a larger piece of membrane. The bond is formed by placing a cementitious bonding layer 67 in the overlapping area and this bonds the fibrous surface layer 63 of the lower membrane to the fibrous surface layer 62 of the upper membrane. If the two pieces of membrane are pre-impregnated with cementitious bonding material, bond in the overlapping areas can be attained by "wetting" the overlapping area and there is no need for a separate bonding layer 67.

Figure 7:
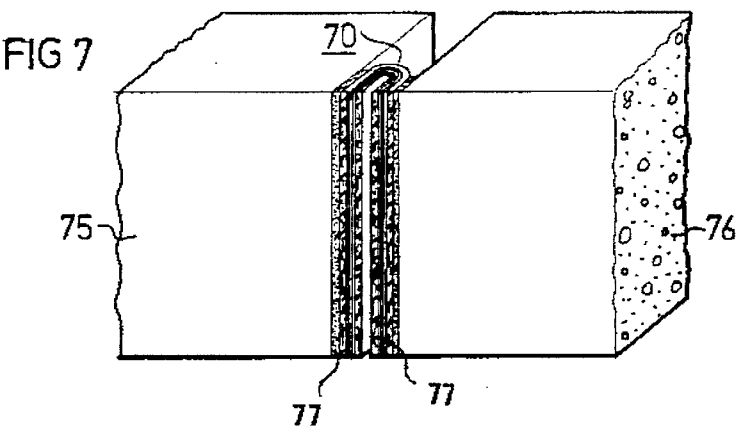

FIG. 7 illustrates the above-described membrane, therein generally designated 70, used as a building joint sealing strip between two concrete structures 75, 76, bonded by bonding layers 77 and having fibrous surface layers pre-impregnated with cementitious bonding material.

Figure 8:
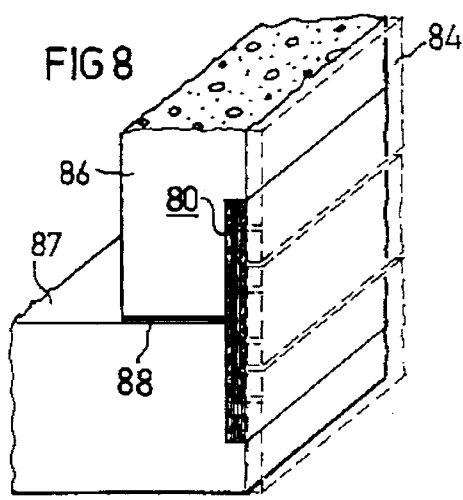

FIG. 8 illustrates the membrane 80 used as a water stop strip between two concrete slabs 86, 87.

Said membrane is used as a water stop for the waterproofing of he interface between the upper layer 86 and the lower layer 87 of a concrete element which is cast in two stages and said membrane is fitted as a lining on the vertical face inside the shuttering 84 before casting and bonds to the vertical sides of the cast layers so that after hardening the membrane is bonded to the vertical surfaces on both sides of the discontinuity 88 and bridges between the upper and lower cast layers.

Figure 9:
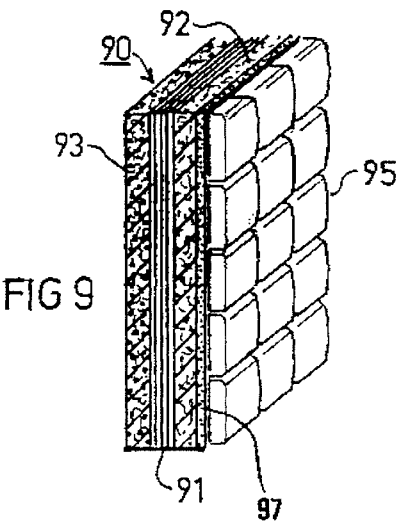

FIG. 9 illustrates the membrane 90 to be used as a waterproofing layer with finishing layer 95 for a structure having a polymeric sheet 91 faced on its opposite side by fibrous surface layers 92, 93. In the example illustrated in FIG. 9, therefore, one surface layer 92 of the membrane 90 is bonded to a plurality of mosaic pieces with a suitable bonding layer 97. The other fibrous surface layer 93 is pre-impregnated with a cementitious bonding material which can be bonded to the surface of the structure receiving the finishing layer by a cementitious bonding layer.

Figure 10:
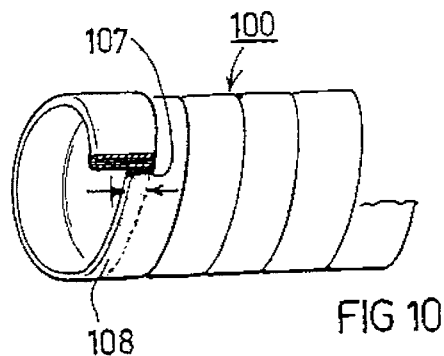

FIG. 10 illustrates the formation of a cylindrical body made of the membrane by winding a tape of said membrane 100 spirally around an axis and progressing along that axis with overlapping edges 108 and bonding the overlapping areas with a bonding layer 107.

What is claimed is:

1. A flexible, protective and waterproofing membrane for application onto a body to conform to a surface of the body and to be bonded thereto, comprising:

a flexible polymeric sheet for providing protection against the penetration of water and having on each of its opposite faces an open-textured surface defining interconnected internal voids open to the atmosphere;

said open-textured surface on each face of the polymeric sheet being impregnated with a dry cementitious material bonded to the respective surface;

said dry cementitious material including a water-hardenable cement which is substantially in a non-hydrated condition, wherein the membrane is capable of being applied to assume the contour of a body and upon wetting said membrane by a cementitious water slurry including non-hydrated cement for applying between the membrane and the body, the membrane becomes bonded to said body by hydration of the non-hydrated cement in said membrane together with the non-hydrated cement in said slurry.

2. The membrane according to claim 1, wherein each of said open-textured surfaces is a layer of fibrous material bonded to the respective face of the polymeric sheet.

3. The membrane according to claim 2, wherein each of said fibrous material layers comprises a polymeric resin for bonding said dry cementitious material thereto.

4. The membrane according to claim 2 wherein said membrane further comprises a conductive metal screen within at least one of said fibrous material layers.

5. The membrane according to claim 2, wherein said dry cementitious material within at least one of said fibrous material layers includes a conductive filler.

6. The membrane according to claim 2, wherein said membrane is applied over another like membrane impregnated with said cementitious water slurry and bonded thereto by hydration of the cement in the two membranes.

7. The membrane according to claim 2, wherein said membrane is in the form of a winding having overlapping portions, which overlapping portions are bonded to each other by hydration of the cement in said overlapping portions.

8. A combination comprising:

a body;

a flexible, protective and waterproofing membrane bonded to a surface thereof, said membrane comprising a flexible, polymeric sheet for providing protection against the penetration of water and having on each of its opposite faces an open-textured surface defining interconnected internal voids open to the atmosphere, said open-textured surface on each face of the polymeric sheet being impregnated with a cementitious material bonded to the respective surface and including a water-hardenable cement which is substantially in a non-hydrated condition; and a layer of cementitious material including water-hardenable cement applied between said membrane and said body, such that hydration of the non-hydrated cement in the membrane together with that in said cementitious material bonds said membrane to said body.

9. The combination according to claim 8, wherein said open-textured surface on each face is a layer of fibrous material bonded to the respective face of the polymeric sheet.

10. The combination according to claim 9, wherein said body comprises concrete.

11. The combination according to claim 9, wherein said membrane is bonded in folded form to surfaces of first and second concrete bodies thereby forming a joint sealing strip between said first and second concrete bodies.

12. The combination according to claim 9, wherein said membrane is bonded to surfaces of first and second concrete bodies for bridging said bodies and for serving as a water stop between said bodies.

13. The combination according to claim 9, wherein said membrane is bonded on one face to a concrete body, and on the opposite face to facing material.

14. The combination according to claim 9, wherein said body is a metal pipe around which said membrane is wrapped.

15. A method of making a flexible, protective and waterproofing membrane for application onto a body to conform to the surface thereof and to be bonded thereto, comprising;

providing a flexible polymeric sheet having on each of its opposite faces an open-textured surface defining interconnected internal voids open to the atmosphere;

impregnating said open-textured surfaces of each face with a cementitious water slurry having a water-hardenable cement therein; and drying said cementitious slurry before said water-hardenable cement significantly hydrates.

16. The method according to claim 15, further comprising providing said polymeric sheet having an open-textured surface on each of its opposite faces by bonding a layer of a fibrous material to each of the opposite faces of the polymeric sheet.

17. A method of protecting a body against corrosion or water penetration, comprising:

bonding fibrous layers to the opposite faces of a polymeric sheet, each fibrous layer having interconnected internal voids open to the atmosphere;

impregnating said fibrous layers with a liquid cementitious impregnant comprising water-hardenable cement;

applying said polymeric sheet and a wet cementitious material also comprising non-hydrated cement to the body before said cement of the impregnant hydrates to a significant extent, such that the cement in said wet cementitious material hydrates together with the cement in said impregnant to bond said polymeric sheet to said body.

18. The method according to claim 17 further comprising applying said wet cementitious material to said body, and applying said polymeric sheet thereover.

19. The method according to claim 17, further comprising applying said wet cementitious material to at least one of said fibrous layers in the polymeric sheet, and applying said polymeric sheet such that said at least one fibrous layer is in contact with said body.

20. The method according to claim 17 further comprising drying said liquid cementitious impregnant before applying said wet cementitious material.

21. The method according to claim 17 further comprising applying said wet cementitious material while the cementitious impregnant of the respective fibrous layer is still wet.

22. The method according to claim 17 further comprising casting said body over said membrane, wherein said body comprises concrete from a concrete mix and provides said wet cementitious material having non-hydrated cement.

23. The method according to claim 22, further comprising applying said polymeric sheet having the impregnated fibrous layers bonded thereto over a supporting surface, and passing said concrete mix over said polymeric sheet such that the respective surface of the concrete body attains the general shape of said supporting surface and the polymeric sheet becomes bonded to a face of the concrete body.

24. The method according to claim 23 wherein said supporting surface is a shuttering lined by said polymeric sheet, said concrete mix being cast within the shuttering.

25. The method according to claim 17, wherein said body is a metal pipe onto which said polymeric sheet is wrapped in an overlapping manner.

26. The method according to claim 20 further comprising drying said liquid cementitious impregnant before applying said wet cementitious material.

* * * * *